United States Patent
Pham et al.

(10) Patent No.: US 6,548,440 B1
(45) Date of Patent: Apr. 15, 2003

(54) SYNTHESIS OF ATTRITION-RESISTANT HETEROGENEOUS CATALYSTS USING TEMPLATED MESOPOROUS SILICA

(75) Inventors: Hien N. Pham, Albuquerque, NM (US); Abhaya K. Datye, Albuquerque, NM (US)

(73) Assignee: Science & Technology Corporation @ UNM, Albuquerque, NM (US)

( * ) Notice: Subject to any disclaimer, the term of this patent is extended or adjusted under 35 U.S.C. 154(b) by 0 days.

(21) Appl. No.: 09/577,173

(22) Filed: May 23, 2000

Related U.S. Application Data

(60) Provisional application No. 60/136,118, filed on May 26, 1999.

(51) Int. Cl.$^7$ .............................. B01J 21/04; B01J 21/06; B01J 23/745; B01J 23/75; B01J 23/22

(52) U.S. Cl. ........................... 502/71; 502/63; 502/64; 502/73; 502/77; 502/177; 502/200; 502/242; 502/247; 502/258; 502/260; 502/325; 502/332; 502/338; 502/349; 502/350; 502/351; 502/353; 502/354; 502/355

(58) Field of Search ............................. 502/63, 64, 71, 502/73, 77, 177, 200, 242, 247, 258, 260, 338, 350, 325, 353, 332, 349, 351, 354, 355; 423/704, 335

(56) References Cited

U.S. PATENT DOCUMENTS

| | | | |
|---|---|---|---|
| 4,572,439 A | 2/1986 | Pitzer | 241/1 |
| 4,587,619 A | 5/1986 | Converse, III | 364/552 |
| 4,677,084 A | 6/1987 | Bergna | 502/8 |
| 5,221,648 A | 6/1993 | Wachter | 502/68 |
| 5,352,645 A | 10/1994 | Schwartz | 502/262 |
| 5,442,012 A | 8/1995 | Kempner et al. | 525/71 |
| 5,633,217 A | 5/1997 | Lynn | 502/439 |
| 5,789,336 A * | 8/1998 | Pazzucconi et al. | 502/233 |
| 5,814,370 A * | 9/1998 | Martino et al. | 427/213.35 |
| 5,922,299 A | 7/1999 | Bruinsma et al. | 423/335 |
| 6,174,512 B1 * | 1/2001 | Kosuge et al. | 423/326 |
| 6,204,424 B1 * | 3/2001 | Yadav et al. | 502/60 |

FOREIGN PATENT DOCUMENTS

| | | | |
|---|---|---|---|
| JP | 9-67115 | * 3/1997 | |
| JP | 10-139417 | * 5/1998 | |
| WO | WO 00/10698 | 3/2000 | |

OTHER PUBLICATIONS

"Preparation of Hard Mesoporous Silica Spheres," Chemistry of Materials, 1997, vol. 9, pp. 14–17.*

Bergna., H.E., Chapter 7 Textbook, "Attrition–Resistant Porous Particles Produced by Spray Drying," Characterization and Catalyst Development, American Chemical Society, 1989, pp 55–64.

Bruinsma, P.J., et al., "Mesoporous Silica Synthesized by Solvent Evaporation: Spun Fibers and Spray–Dried Hollow Spheres," Chem. Mater., vol. 9, pp 2507–2512 (1997).

Iler, R.K., Textbook, "Characterizing Pores by Adsorption Isotherms," The Chemistry of Silica, pp 488–497 John Wiley & Sons (1979(.

Lu, Y., et al., "Aerosol–Assisted Self–Assembly of Mesostructured Sperical Nanoparticles," Nature, vol. 398, pp 223–226 (Mar. 18, 1999).

Kresge, C.T., et al., "Ordered Mesoporous Molecular Sieves Synthesized by a Liquid–Crystal Template Mechanism," Nature, vol. 359, pp 710–712 (Oct. 22, 1992).

Pham, H.N., et al., "Measuring the Strength of Slurry Phase Heterogeneous Catalysts," Powder Technology, vol. 103, pp 95–102 (1999).

Pham, H.N., et al., "Improving the Attrition Resistance of Slurry Phase Heterogeneous Catalysts," Powder Technology, 39/5 (1999) in press.

Shroff, M.D., et al., "Activation of Precipitated Iron Fischer—Tropsch Synthesis Catalysts," J. of Catalysis, vol. 159, pp 185–297 (1995).

* cited by examiner

Primary Examiner—Tom Dunn
Assistant Examiner—Christina Ildebrando
(74) Attorney, Agent, or Firm—Jeffrey D. Myers

(57) ABSTRACT

The present invention relates to catalysts in mesoporous structures. In a preferred embodiment, the invention comprises a method for encapsulating a dispersed insoluble compound in a mesoporous structure comprising combining a soluble oxide precursor, a solvent, and a surfactant to form a mixture; dispersing an insoluble compound in the mixture; spray-drying the mixture to produce dry powder; and calcining the powder to yield a porous structure comprising the dispersed insoluble compound.

26 Claims, 15 Drawing Sheets

Phase Transformations during activation of Iron oxide Fischer-Tropsch Catalysts.

SYNTHESIS OF ATTRITION-RESISTANT HETEROGENEOUS CATALYSTS USING TEMPLATED MESOPOROUS SILICA

CROSS-REFERENCE TO RELATED APPLICATIONS

This application claims the benefit of the filing of U.S. Provisional Patent Application Serial No. 60/136,118, entitled "Synthesis of attrition resistant heterogeneous catalysts using spray-dried mesoporous silica," filed on May 26, 1999, and the specification thereof is incorporated herein by reference.

GOVERNMENT RIGHTS

The U.S. Government has a paid-up license in this invention and the right in limited circumstances to require the patent owner to license others on reasonable terms as provided for by the terms of Contract ID Code DE-FG26-98FT40110 awarded by the United States Department of Energy.

BACKGROUND OF THE INVENTION

1. Field of the Invention (Technical Field)

The present invention relates to catalysts in mesoporous structures.

2. Background Art

Note that the following discussion refers to a number of publications by author(s) and year of publication, and that due to recent publication dates certain publications are not to be considered as prior art vis-a-vis the present invention. Discussion of such publications herein is given for more complete background and is not to be construed as an admission that such publications are prior art for patentability determination purposes.

The following references discuss silica and/or catalyst chemistry: "The Chemistry of Silica: Solubility, Polymerization, Colloid and Surface Properties, and Biochemistry," R. K. Iler, Wiley, New York, 1979; "Attrition-Resistant Porous Particles Produced by Spray-Drying," H. E. Bergna, Characterization and Catalyst Development: An Interactive Approach, American Chemical Society, 1989, 55–64; "Ordered Mesoporous Molecular-Sieves Synthesized by a Liquid-Crystal Template Mechanism," Kresge, et al., *Nature*, 1996, vol. 359, 710; "Activation of Precipitated Iron Fischer-Tropsch Catalysts," Shroff, et al., *J. Catalysis*, 1995, vol. 156, 185; "Mesoporous Silica Synthesized by Solvent Evaporation: Spun Fibers and Spray-Dried Hollow Sphere," Bruinsma, et al., *Chem. Mater.*, 1997, vol. 9, 2507; "Aerosol-Assisted Self-Assembly of Mesostructured Spherical Nanoparticles," Lu, et al., *Nature*, 1999, vol. 398, 223; and "Measuring the Strength of Slurry Phase Heterogeneous Catalysts," Pham, et al., Powder Technol., 1999, vol. 103, 95.

The present invention pertains to, for example, a slurry phase Fischer-Tropsch (F-T) synthesis, a process used to convert energy reserves of coal and natural gas into liquid transportation fuels. At present, F-T synthesis is being practiced in South Africa for converting coal-derived syngas ($CO+H_2$) into hydrocarbon waxes which are subsequently processed to the desired product slate.

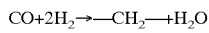

The preferred reactor type for F-T synthesis is a slurry phase bubble column reactor (SBCR) for F-T synthesis, which provides improved heat and mass transfer and operational simplicity in terms of catalyst loading and discharge. The catalyst commonly used for F-T synthesis is iron or cobalt. A potential disadvantage in using a SBCR involves the attrition of catalysts. Attrition becomes a problem with the F-T process when heavy waxy products are produced, and separation becomes difficult between the wax and nano-sized catalyst particles. The filter system can become plugged by the nano-particles, slowing down the recovery of liquid reaction products. Development of attrition-resistant iron catalysts is an urgent need for catalytic processes that operate in a liquid phase, and where separation of the catalyst from viscous liquid products is required. Several approaches have been proposed for the preparation of attrition-resistant catalytic materials.

U.S. Pat. No. 4,677,084 ("'084 patent") discloses a process for making attrition-resistant catalysts, catalyst precursors and catalyst supports. The slurry consists of a catalyst material in an aqueous silicic acid solution that is spray-dried to form porous microspheres, having diameters ranging from 30 microns to 300 microns (1 micron equals $1 \times 10^{-6}$ meters). According to the '084 patent, the relative amounts of particles and silicic acid are chosen so that the weight of the silica formed ranges from 3% to 15% of the total weight of particles and silica. The '084 patent further states that the spray-dried microspheres are calcined to sinter and generate the catalyst. A calcination temperature is used that is below a temperature that is deleterious to the catalyst. The '084 patent discloses attrition resistance measurements of the catalyst material, measured using a device where the catalyst is exposed to a high velocity gas jet.

A reference authored by H. Bergna that appears in Proc. Of the American Chemical Society symposium on Characterization and Catalyst Development, 1989, p. 55, ("Bergna reference") discloses embedding of catalyst particles in a continuous framework or skeleton of a hard and relatively inert material to enhance attrition resistance. The approach of the Bergna reference requires that the fraction of the hard phase volume approach 50% to form an attrition-resistant continuous framework within the grain pores. The Bergna reference also discloses use of sub-colloidal or very small colloidal particles capable of coalescing or sintering to form a hard eggshell thereby conferring a degree of attrition resistance with smaller amounts (10%) of a hard phase (silica). In this particular case, the silica must be distributed on the periphery of the particles, which is achieved by ensuring the following two conditions: (i) that the silica does not agglomerate during spray drying and (ii) that the silica particles migrate easily to the surface.

U.S. Pat. No. 5,221,648 discloses a process for making highly mesoporous catalytic cracking catalysts, particularly catalysts useful in fluidized catalytic cracking operations. Attrition resistance of these catalysts is measured in terms of the Davison Index, which is well known to practitioners in the field of catalysis.

U.S. Pat. No. 5,352,645 ("'645 patent") discloses a process for making relatively strong, non-agglomerated porous uniform silica microspheres ranging in size from 1.0 microns to 50 microns. According to the '645 patent, the microspheres are useful as catalytic supports in fluid bed and slurry applications, particularly in the catalytic process for the direct synthesis of hydrogen peroxide. The '645 patent also discloses use of an aqueous sol of colloidal silica that is mixed with a soluble additive selected from ammonium citrate or urea, and subsequently spray-dried to form silica microspheres. The spray-dried powder is calcined to remove any organic residues and sintering of the primary particles is performed to develop strength and porosity. The '645 patent discloses an attrition test that is performed by vibrating a mixture of the material in question and a granular alumina grinding medium in a heavy duty orbital sander. The particle size distribution of the material, separated from the grinding medium, is then analyzed using a Microtrac Model 158705 Analyzer, a typical particle size analyzer known in the art of particle size analysis.

U.S. Pat. No. 4,572,439 discloses a process for providing a rapid treatment for materials to be used in catalytic processes. Acoustical energy is applied to a slurry consisting of the material in question. After separating the aftrition-resistant particles from the liquid medium, the frangible particles are disintegrated to a fine powder and are separated from the liquid by filtration. The fines are agglomerated to suitably sized particles, and recycled to be slurried with the untreated material to be subjected to the attrition treatment.

U.S. Pat. No. 5,442,012 discloses a process for making encapsulated micro-agglomerated core/shell additives for PVC blends. A first core/shell impact modifier and a second core/shell processing aid are prepared separately by emulsion polymerization. The polymer particles are then admixed in emulsion form. The core/intermediate shell polymer particles are agglomerated, followed by sequential emulsion polymerization to form an encapsulating shell of hard polymer. This final shell can encapsulate more than one particle.

U.S. Pat. No. 5,633,217 discloses a process for making a high strength catalyst, catalyst support or adsorber, which makes use of silicone resin as an inorganic binder precursor dissolved in a cost-effective, non-flammable solvent.

The methods and materials disclosed and/or proposed in the aforementioned references for preparing attrition resistant catalysts fall short for preparing catalysts that are subject to phase transformations during use. For example, as disclosed in the Shroff et al., *J. Catal.*, 156, p 185, 1995, reference, an iron catalyst start out in the form of an oxide and then gets converted to an iron carbide after activation in a Fischer-Tropsch reaction environment. The increase in density between the oxide and carbide phase leads to a break-up of the iron oxide to form nanoparticles of iron carbide. Hence, even if the catalyst could be prepared in attrition-resistant form, the phase changes tend to stress and weaken the catalyst during use.

The synthesis of mesoporous materials has attracted great interest in the field of catalysis, biomaterials, membrane and separation technology, and molecular engineering. Most mesoporous materials, such as silica, disclosed in the R. K. Iler, *Chemistry of Silica*, Wiley, N.Y., 1979, reference are amorphous, with pores that are irregularly spaced and broadly distributed in size. Recently, the Kresge et al., *Nature*, 359, p. 710, 1992, reference disclosed the synthesis of mesoporous silica by means of a liquid-crystal template mechanism, in which the silicate material forms inorganic walls between ordered surfactant micelles. Ordered arrays of cylindrical micelles are formed, with the silicate species occupying the spaces between the micelles. Once an ordered array of uniform channels is established, the organic material is burnt off to produce a stable crystalline mesoporous solid.

The synthesis proposed in the Kresge et al., *Nature*, 359, p. 710, 1992, reference involves placing a mixture of reagents in an autoclave for 48 hours. From an application standpoint, the synthesis approach is not suitable for large-scale production. An alternative approach was disclosed in the Lu et al., *Nature*, 398, p. 223, 1999 reference where they used an aerosol process for the synthesis of mesostructured spherical nanoparticles. The methodology of the Lu reference involves evaporation-induced surfactant self-assembly to synthesize silica thin films, membranes, particles, and nano-composite materials with highly ordered mesophase structures via dip coating or aerosol processes. A similar evaporation approach was also reported in the Bruinsma et al., *Chem. Mater.*, 9, 2507, 1997 reference to yield mesoporous silica. In this latter work, the authors spray-dried powders, using a precursor solution consisting of cetyltrimethylammonium chloride ("CTAC"), hydrochloric acid, tetraethoxysilane ("TEOS"), and water. These spray-dried mesoporous powders had structures ranging from hollow spheres to collapsed particles that were dependent on the precursor solution composition and drying conditions.

The approach disclosed in the Bruinsma et al. reference is disclosed further in U.S. Pat. No. 5,922,299 ("'299 patent"), which discloses a process for making mesoporous-silica films, fibers, and powders by evaporation of a solvent from the silica precursor solution. According to the '299 patent, evaporation or rapid drying is accomplished by layer thinning, such as spin casting, liquid drawing and liquid spraying. When powders are produced by liquid spraying, micro-bubbles within the powder are hollow spheres with walls composed of mesoporous silica. The '299 patent states that the mesoporous silica fibers may be impregnated with catalytically active metals for applications in structured catalytic packing. The metal addition to the mesoporous materials is via soluble metal salts such as halide or nitrate solutions only. The '299 patent does not disclose the use of metal oxides or the addition of insoluble forms of metal catalysts. In F-T type reactions, the dispersion of a salt of iron throughout a catalyst/catalyst support often leads to adverse metal-support interaction that decreases the activity of the iron catalyst. The method of the '299 patent also has an inherent limitation as to the amount of an iron phase that can be loaded into a mesoporous silica.

The use of mesoporous supports for Fischer-Tropsch synthesis has been recently reported in Patent Cooperation Treaty, International Publication No. WO 00/10698 ("'698 PCT publication"). In this publication, a F-T process is disclosed. According to the '689 PCT publication, the catalyst includes at least one catalytic metal for F-T reactions and a non-layered mesoporous support which, after calcination, exhibits an XRD pattern that has at least one peak at a d-spacing of greater than 18 Å. The '689 PCT publication discloses a process for metal loading in a range from 10% by weight to 30% by weight of metal. Supports having such low weight percents of metal are only suitable and industrially practical for metal catalysts having high activity, for example, cobalt and/or ruthenium catalysts. Indeed, the '698 PCT publication does not teach a process for incorporating higher weight percentages of metal catalysts. For example, iron catalysts have a considerably lower activity when compared to cobalt and/or ruthenium catalysts; therefore, the weight percentage of an iron catalyst must be substantially greater than 30%. Such high weight percentage loading cannot be achieved with the approach disclosed in the '689 PCT publication.

SUMMARY OF THE INVENTION DISCLOSURE OF THE INVENTION

The present invention comprises a method and a composition of matter. In a preferred embodiment, the present invention comprises a method for encapsulating a dispersed insoluble compound in a mesoporous structure comprising the steps of: combining a soluble oxide precursor, a solvent and a surfactant to form a mixture; dispersing an insoluble compound in the mixture; spray-drying the mixture to produce dry powder; and calcining the powder to yield a porous structure comprising the dispersed insoluble compound. In this preferred embodiment, the method optionally comprises the step of introducing a precipitation control agent to the mixture to control precipitation of the oxide precursor. In general, such agents comprise acids, such as, but not limited to, HCl and $HNO_3$. The method of this preferred embodiment also optionally comprises the step of cooling the mixture to control precipitation of the oxide precursor. According to a preferred embodiment, cooling comprises cooling to a temperature of approximately 10° C. or less. To facilitate cooling to temperatures below the freezing point of the mixture, in a preferred embodiment, the solvent comprises at least one solvent comprising at least one antifreeze. For example, the present invention optionally comprises solvents comprising alcohols, such as, but not limited to, polyethylene glycol, ethylene glycol, ethanol, propylene glycol, and propanol, and other solvents that optionally comprise, for example, surfactants, such as nonionic surfactants. According to a preferred embodiment, solvent, or solvent mixtures, comprise a flash point below that of temperatures encountered in the spray drying step, alternatively, spray drying comprises spray drying in a substantially inert gas, or a gas that diminishes solvent ignition. According to the present invention, dispersing optionally comprises two steps comprising, for example, introducing and dispersing and/or combining and dispersing. For example, an insoluble compound is optionally combined with the components of the combining step and/or introduced to the mixture and then later dispersed. However, according to a preferred embodiment, dispersing comprises introducing at least one insoluble compound to the mixture. Of course, in some embodiments, the insoluble compound is not fully encapsulated, for example, but not limited to, some of the insoluble compound is optionally positioned at the outermost surface of a porous structure partide. Such embodiments are within the scope of the present invention; however, according to preferred embodiments, at least some of the insoluble compound is fully encapsulated in the porous structure.

In a preferred embodiment, the oxide precursor comprises an alkoxide of silicon and preferably a tetraethyl orthosilicate (TEOS) alkoxide of silicon. The method of the present invention optionally comprises at least one oxide precursor wherein the oxide precursor comprises at least one precursor selected from the group consisting of silicic acid, zirconium alkoxide, titanium alkoxide, and aluminum alkoxide.

According to a preferred embodiment of the present invention, the surfactant comprises at least one surfactant comprising at least one ammonium ion and preferably the surfactant comprises at least one surfactant, for example, but not limited to, cetyltrimethylammonium bromide (CTAB) and cetyltrimethylammonium chloride (CTAC). According to the present invention, surfactant comprises at least one surfactant, including, but not limited to, amphoteric surfactants, nonionic surfactants, anionic surfactants, cationic surfactants and/or molecules that migrate to a surface between two phases and/or form assemblies.

In a preferred embodiment, the method of the present invention comprises at least one additional step of adjusting pH of the mixture, preferably after the combining step and preferably to a pH of less than approximately pH 5. This particular embodiment optionally comprises at least one adjusting step, preferably for adjusting the pH of the mixture to a pH less than approximately pH 5.

In a preferred embodiment, the insoluble compound comprises at least one oxide. In this embodiment, the at least one oxide optionally comprises at least one oxide, such as, but not limited to, iron oxide, titanium oxide, cobalt oxide and vanadium oxide. The insoluble compound also optionally comprises at least one zeolite, for example, but not limited to, catalytic zeolites. In a preferred embodiment, the insoluble compound comprises ZSM-5 zeolite.

In another preferred embodiment the insoluble compound optionally comprises at least one non-oxide phase wherein the at least one non-oxide phase optionally comprises at least one non-oxide phase selected from the group consisting of nitride and carbide, for example, but not limited to, at least one non-oxide phase optionally comprising molybdenum nitride, iron carbide and/or molybdenum carbide.

In a preferred embodiment, the dispersing step comprises sonication, for example, but not limited to, ultrasonication at frequencies greater than or equal to approximately 20 KHz. Of course lower frequencies are within the scope of the present invention. Power input is also a parameter that is adjustable to achieve a desired dispersion of the insoluble compound. Of course, as disclosed herein, use of more than one insoluble compound is within the scope of the present invention as is a plurality of dispersion steps and/or sonication steps. According to the present invention, an insoluble compound of the dispersing step preferably comprises sub-micron dimensions upon addition and/or upon dispersion in the mixture through use of dispersion mechanisms known in the art of particle science, such as, but not limited to, radiation induced dispersion and/or disruption, including sonic radiation and/or electromagnetic radiation.

In a preferred embodiment the mixture of the combining step forms a template for templating a mesoporous structure. In such an embodiment, a precipitation control agent of the introducing step allows for formation of a template for templating a mesoporous structure by delaying precipitation of the oxide precursor. Optionally, cooling, alone or in addition to a precipitation control agent, allows for formation of a template.

According to a preferred embodiment, the calcining step substantially removes the surfactant. Optionally, the calcining step removes other material not removed, or sufficiently removed, during the spray-drying step. For example, residual solvent, antifreeze, other agents and/or material is optionally removed during the calcining step.

The present invention also comprises a composition of matter comprising the porous structure comprising the dispersed insoluble compound of the inventive method. In a preferred embodiment, the composition of matter comprises a porous structure comprising a dispersed insoluble compound wherein the porous structure comprises pores formed by an oxide precursor templated on a surfactant template. In a preferred embodiment, the pores allow gas to access said dispersed insoluble compound. The insoluble compound optionally comprises a catalyst, which optionally changes phase during use as a catalyst and/or upon exposure to a reducing agent in the case of, for example, an insoluble compound comprising an oxide, preferably at least one metal oxide, such as, but not limited to, iron oxide. Reducing agents include, but are not limited to, hydrogen gas.

In a preferred embodiment, the composition of matter comprises a porous structure comprising an ordered porosity, preferably wherein the ordered porosity corresponds to an order from a surfactant template.

In a preferred embodiment, the composition of matter comprises resistance to attrition. In another preferred embodiment, the composition of matter comprises a Fischer-Tropsch catalyst.

In a preferred embodiment, the composition of matter comprises a porous structure comprising a phase-changed dispersed insoluble compound comprising nanoparticles (generally particles comprising submicron dimensions) wherein the porous structure comprises pores formed by an oxide precursor templated on a surfactant template. In such a preferred embodiment, the pores optionally comprise an average pore size that retains phase-changed nanoparticles (generally particles comprising submicron dimensions) of the dispersed insoluble compound within the porous structure.

The present invention comprises a method and a composition of matter.

A primary object of the present invention is to produce attrition resistant particles comprising at least one catalyst.

A primary advantage of the present invention is attrition resistance.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS

Figure 1:
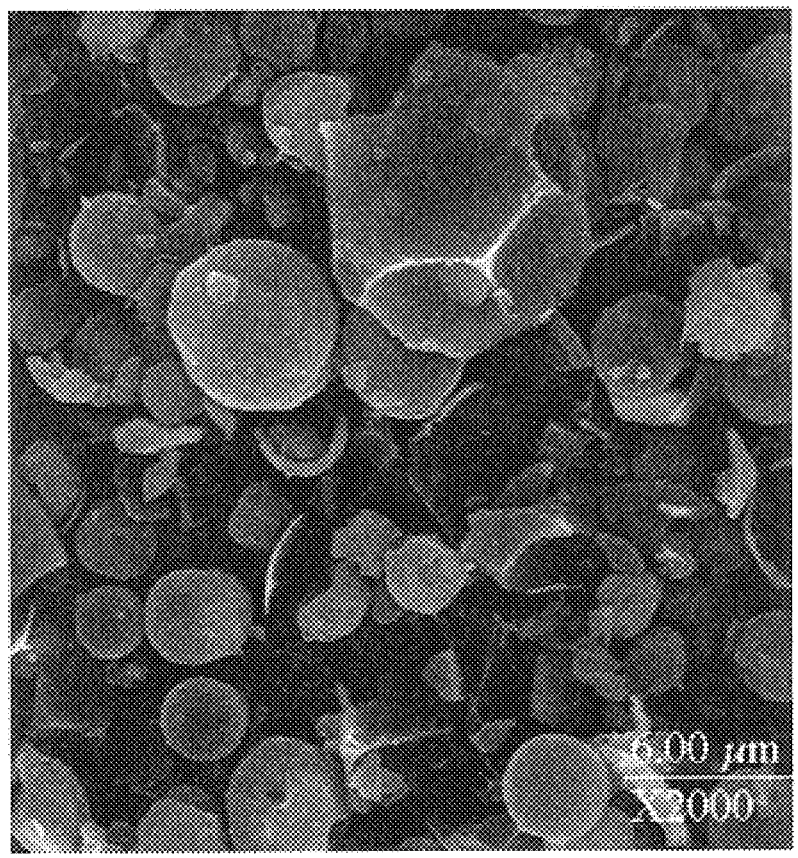
FIG. 1 shows a Scanning Electron Microscope ("SEM") image of the encapsulated material.

Best Modes for Carrying Out the Invention

The present invention comprises a method to disperse a high concentration of a catalytically active phase within a mesoporous solid and a composition of matter made via the inventive method. The need for the method and composition of the present invention is particularly high and germane to heterogeneous catalysis processes where breakup of the catalytically active phase is undesirable. For example, breakup of the catalytically active phase drastically reduces overall process efficiency and increases product cost. The present invention comprises a catalytic composition that, according to a preferred embodiment, outlasts conventionally catalysts because of its resistance to phase change-induced breakup.

In a preferred embodiment, the inventive method is used to make an iron catalyst that is useful for performing F-T synthesis. In this particular preferred embodiment, nanoparticles of iron oxide are encapsulated within a structure comprising mesoporous silica comprising pores of sufficient dimensions to allow for reactants to diffuse through the pores of the structure thereby allowing the F-T synthesis reaction to proceed. Yet, according to this particular embodiment, the pores of the structure are small enough to keep the nanoparticles inside the structure. And in a preferred embodiment, the pores of the structure are small enough to retain the nanoparticies inside the porous structure even after the nanoparticies undergo further phase change. The silica-based structure provides attrition resistance to the resulting catalyst/support particles.

Although pores comprising a random pore size distribution are within the scope of the present invention, according to a preferred embodiment, the inventive method makes pores comprising a more narrow distribution of pore sizes. In this preferred embodiment, the method comprises a method of controlling the porosity of silica by varying the amount of reagents used to prepare the precursor. Obtaining a narrow distribution of pore size is beneficial to certain catalytic applications where the size may limit the range of products that can be formed, in part, for example, due to diffusion limitations.

The aforementioned '084 patent discloses a method whereby silica is distributed to form a structure consisting of a thin shell that provides attrition resistance. In this manner, low loading of silica (5%–15%) may still provide some degree of attrition resistance. In a preferred embodiment of the present invention, silica-based structures comprise, for example, very thin walls. In this preferred embodiment, the very thin walls allow for low loading of silica while still imparting sufficient attrition resistance to the inventive catalyst/support particles. The concept used in such an embodiment is perhaps analogous to natural support materials that are quite strong, for example, human bone, which comprises a lattice comprising a low volume fraction. In this particular preferred embodiment, the "lattice" of the silica support is optionally controlable through, for example, chemical composition of a precursor solution. In a preferred embodiment, the "lattice" of the silica support comprises pores resulting in part from assemblies of molecules, including, but not limited to, micelle assemblies of surfactant molecules. Such micelle assemblies, include, but are not limited to, liquid crystalline, lamellar and non-lamellar assemblies.

The aforementioned '299 patent discloses a method for synthesis of mesoporous structures. The entire specification of the '299 patent, particularly the disclosure of this method, is hereby incorporated by reference. According to the '299 patent, metal compounds are added to the silica precursor solution to prepare supported metal catalysts. The metal compounds described are selected from the group consisting of metal halide, metal nitrate, and combinations thereof. In contrast to the soluble metal compounds disclosed in the '299 patent, the present invention discloses, in a preferred embodiment, a method of making catalyst/support particles using insoluble metal compounds, preferably insoluble metal compounds that are present as colloidal dispersions. According to this preferred embodiment of the present invention, a high loading of the dispersed phase is achieved within a mesoporous silica structure. According to a preferred embodiment of the present invention, an insoluble metal compound comprises, for example, but not limited to, at least one oxide wherein the at least one oxide comprises, for example, at least one iron oxide, at least one titanium oxide, at least one cobalt oxide and/or at least one vanadium oxide. In general, such metal compounds comprise submicron particles, and preferably particles on the order of 100 nanometers or less, which can be dispersed within the silica structure.

The present invention, however, is not limited to particles comprising every dimension on an approximately submicron scale. In a preferred embodiment the invention comprises, for example, but not limited to, insoluble compound particles comprising strands, fibers, and other forms that optionally comprises a dimension greater than approximately 1 micron.

The process disclosed in the '299 patent yields hollow silica shells when liquid droplets are spray dried. The hollow shells can be easily crushed and will not provide any substantial attrition resistance, especially if the shell wall is too thin to maintain the shell's strength. The spherical form of the spray-dried particles is particularly useful in many applications; however, the '299 patent does not provide nor teach a method to obtain strong particles that retain their form during use. In contrast, a preferred embodiment of the method of the present invention makes particles comprising desired attrition resistance properties that makes them useful as catalysts in applications, such as, but not limited to, Fischer-Tropsch synthesis.

In many applications where high loading of the dispersed phase is required, impregnating a mesoporous support with a catalytically active metal results in non-spherical particles. In a preferred embodiment, the method of the present invention produces spherically shaped particles with high loading of the dispersed phase. The spherical shape of the particles is potentially useful in for promoting proper slurry hydrodynamics, such as in a bubble column reactor. For example, during operation of a stirred tank reactor, more attrition is expected with non-spherical particles than with smooth spherical particles.

According to a preferred embodiment of the present invention, encapsulation of iron oxide within a porous support structure, provides for a catalyst/support particles that retains nanoparticles that are formed during use and prevents such nanoparticles from escaping into a reaction mixture. This embodiment comprises a method that makes a supporting structure that retains nanoparticles, while at the same time, provides reactants access to catalytic sites and easy egress of reaction products. According to this particular embodiment of the present invention, a suitable structure for this purpose comprises a mesoporous oxide prepared by a method comprising a liquid-crystal template mechanism.

According to a preferred embodiment of the present invention, encapsulated particles on the order of microns and tens of microns, are produced, which in some instances are preferred for commercial processes when compared to the sub-micron sized particles disclosed in the aerosol process of Lu et al., *Nature*, 398, 223, 1999.

Inventive compositions produced by preferred embodiments of the method of the present invention were tested for attrition resistance using ultrasonic irradiation coupled with a Micromeritics Sedigraph 5100 particle size analyzer. Attrition resistance is measured by analyzing the particle size distribution of the product, at various times of ultrasonic irradiation, to detect the mode of particle fragmentation.

Various aspects of the methods and compositions of present invention are disclosed in greater detail below and in certain instances with reference to the drawings. The disclosure begins with a discussion on the preparation or synthesis of nanoparticles comprising at least one metal followed by a discussion on a test for attrition resistance. The disclosure proceeds to a detailed description of the inventive methods and the inventive composition made from the methods. Next examples are disclosed for practicing the invention.

Synthesis of Fe—Cu Nanoparticles

Particles other than submicron particles and metals other than iron and copper are within the scope of the present invention. However, according to a preferred embodiment, nanoparticles (submicron particles) comprise at least one metal wherein at least one of the at least one metal comprises iron, for example, a metal compound comprising a precipitated iron oxide.

A precipitated Fe—Cu catalyst in its wet form was prepared as follows. The starting materials were nitrates of iron and copper, and ammonium hydroxide. A mixture composed of approximately 600 g of $Fe(NO_3)_3 \cdot 9H_2O$ (Aldrich Chemical Co.), approximately 15 g of $Cu(NO_3)_2 \cdot 3H_2O$ (Fisher Chemical Co.), and approximately 6,159 ml of distilled water was heated at approximately 80° C. Another mixture composed of approximately 600 ml of ammonium hydroxide concentrate and approximately 5,671 ml of distilled water was also heated at approximately 80° C. A Haake heater (Gebrueder Haake, GmbH, Germany) was initially heated before heating the second mixture to prevent ammonium hydroxide from vaporizing.

One pump for the nitrate solution was at a setting of approximately 3.1, and another pump for the ammonium hydroxide solution was at a setting of approximately 1.0. With both pumps on, the product catalyst was discarded until the pH was between approximately 6.8 and approximately 7.2. The catalyst was then collected using a large filter funnel. The pump speeds were adjusted to keep the pH near 7.0, and any excess ammonium hydroxide solution was discarded. The filter cake was pumped down to a wet, but not cracked, stage.

A sample of the filtrate was obtained for pH and brown ring tests to ensure that the pH remained near 7.0 and that traces of nitrate ions were removed from the catalyst, respectively. The filter flask was replaced with a clean filter flask to continue with the water aspiration. Once all the water has come through, the cake was removed, and approximately 5000 ml of hot water was added to the cake to stop the growth of particles in the precipitate. Any extra filtrate was sampled for pH and brown ring tests. After approximately 4 to approximately 8 min, the catalyst in water was scooped out and poured slowly into the filter funnel. After a negative brown ring test was obtained for the sampled filtrates, and approximately 14 L of hot wash water at approximately 80° C. was added, the rinsing was stopped and the filter cake was pumped in its moist state. Once it was dry enough, the cake was added to water to produce a precipitated Fe—Cu catalyst in its wet form (approximately 64.80 wt % Fe and approximately 6.24 wt % Cu).

Ultrasonic Testing for Attrition Resistance

According to the present invention, attrition resistance is measureable by a variety of procedures, including, but not limited to, the procedure described herein. A procedure for ultrasonic testing for attrition resistance is described in more detail by Pham et al., *Powder Technol.*, 103 95–102 (1999), incorporated herein by reference. In this procedure, a sample is dispersed in an aqueous medium and subject to ultrasonic irradiation. A particle size distribution is measured as a function of irradiation time, and a fixed power level. The instrument is calibrated so that the extent of particle breakage at a given power level and time can be related to the crushing strength of a powder evaluated by more conventional means. The particle size distributions provide a graphic illustration of the fragmentation into smaller sized units as the irradiation proceeds. The mechanism of particle fragmentation, fracture versus erosion, can also be inferred from particle size distribution data. In general, this procedure provides a rapid test of the attrition behavior of, for example, but not limited to, spray-dried catalyst powders.

Inventive Methods of Making Catalyst/Support Particles

According to a preferred embodiment, the method of the present invention comprises a templated silica precursor mixed with at least one insoluble metal compound followed by spray-drying to produce a high concentration of a catalytically active phase dispersed within a mesoporous silica. After the spray-drying step, at least one calcining step is performed to remove at least one surfactant and/or other material used to template the silica precursor.

In a preferred embodiment, templated silica precursor is prepared by a method comprising mixing at least one silica precursor with at least one surfactant and at least one acid in aqueous solution. The at least one surfactant templates the at least one silica precursor, and the at least one acid catalyzes the hydrolysis of the at least one silica precursor. At least one insoluble metal compound is optionally sonicated for, for example, approximately several minutes before it is added to the templated silica precursor. The optionally sonicating step breaks up any loose agglomerates of the insoluble metal compound to allow better dispersion of the metal compound particles in the silica precursor solution.

In the spray-drying step, the metal-silica mixture is, for example, atomized into fine droplets. Of course, a variety of forces may act upon the spray-dried material to alter the shape of the droplets. Solvent evaporation must be more rapid than polymerization of silica to allow continual restructuring of the silica-surfactant phase to form suitable particles. Otherwise, a rigid crust will form due to premature solidification that inhibits the restructuring of silica. After the spray-drying step, spray-dried catalyst/support particles, usually in the form of a dry powder, are collected and then calcined to remove any residual surfactant and/or other material.

According to a preferred embodiment of the present invention, the silica precursor optionally comprises an alkoxide silica precursor or a silicic acid. A preferred alkoxide silica precursor is tetraethyl orthosilicate (TEOS). Other alkoxide silica precursors include, but are not limited to, tetramethyl orthosilicate (TMOS), tetrapropyl orthosilicate and tetrabutyl orthosilicate. A preferred surfactant comprises at least one ammonium cation. The at least one cation optionally comprises a quaternary ammonium cation, such as, but not limited to, cetyltrimethylammonium bromide (CTAB) or chloride (CTAC), or a tertiary ammonium cation. A preferred metal compound comprises a metal oxide, including but not limited to, iron oxide, titanium oxide and vanadium oxide. Other metal compounds of interest and within the scope of the present invention include nitrides as well as carbides, for example boron nitride or iron carbide.

According to a preferred embodiment of the present invention, particle size of the metal compound particles preferably comprises a size less than approximately 1 micron and more preferably on the order of nanometers, for example, less than approximately 100 nanometers. Larger particle sizes increase the possibility of inhibiting the metal particles from being encapsulated inside the mesoporous silica because they may settle easily and not become dispersed in the precursor solution. Of course schemes that use low gravity or other methods to maintain a dispersion of insoluble compounds are within the scope of the present invention. In a preferred embodiment, metal loading is preferably greater than approximately 30% by weight of the catalyst/support particle and more preferably greater than approximately 50% by weight of the catalyst/support particle. More specifically, metal loading is such that the metal to silica ratio is high enough to achieve a desired catalytic activity while still maintaining a desired attrition resistance of the encapsulated material.

According to a preferred embodiment, a method of the present invention comprises at least several steps. For example, a method for synthesizing attrition-resistant heterogeneous catalysts using spray-dried mesoporous silica, comprising the steps of: combining a silica precursor with an aqueous solvent, an acid and a surfactant comprising an ammonium cation designed to yield a templated silica; adding an insoluble metal compound, optionally sonicating the metal compound to break-up any loose agglomerates, to the silica precursor solution; spray-drying the mixture to produce dry powder; and calcining the powder to remove the surfactant and optionally other material. Of courses this inventive method optionally comprises use of more than one silica precursor, more than one aqueous solvent, more than one acid and/or base, more than one surfactant wherein the surfactant comprises at least one cationic, anionic, and/or polar property, and more than one metal compound, including soluble and insoluble metal compounds wherein at least one of the metal compounds comprises an insoluble compound.

Compositions of the Present Invention

According to the present invention, inventive compositions are formed via inventive methods discussed herein. In a preferred embodiment, the inventive composition comprises nanoparticles that are not encapsulated inside a hollow silica shell. In general, hollow shells provide considerably less attrition resistance, especially for thin shell walls that fail to maintain any appreciable shell strength.

According to a preferred embodiment of the present invention, nanoparticles reside substantially inside a porous structure. This particular feature of the composition of this preferred embodiment is useful, especially in a F-T process where iron catalyst undergoes phase transformations. During reduction in synthesis gas, the iron oxide transforms into iron carbides. The decrease in specific volume going from the oxide to the carbide phase causes a breakup of the insoluble compound. This process can be thought of as chemical attrition. According to this embodiment, a supporting structure comprising the ability to accommodate chemical attrition is preferred. As disclosed above, in a preferred embodiment, the catalytically active phase is retained inside a three-dimensional silica framework, which allow for retention of even nanometer sized particles of the iron carbide phase.

Industrial Applicability:

The invention is further illustrated by the following non-limiting examples.

EXAMPLE 1

In a typical run, approximately 100 ml of the precipitated Fe—Cu catalyst suspension was ultrasonicated at an amplitude of approximately 20 for approximately 2 min to break up any loose agglomerates. The catalyst was then added to a templated silica precursor composed of approximately 5.0 g of cetyltrimethylammonium bromide CTAB; Aldrich), approximately 2.0 ml of approximately 1 N hydrochloric acid (VWR), approximately 20 ml of tetraethyl orthosilicate (TEOS; Aldrich), and approximately 100 ml of deionized water. The mixture was shaken vigorously such that the catalyst particles were well dispersed in solution. The mixture was then spray-dried using a Buchi 190 Mini Spray Dryer. Air at approximately 60 psi was the atomizing gas. The inlet temperature of the heated air was over approximately 200° C., and the outlet air temperature was maintained over approximately 100° C. The mixture was fed through the spray dryer in a co-current flow configuration. The feed rate was approximately 5 ml/min, and the main fraction of the particles was carried over to a cyclone separator that discharged the product to a collector, yielding approximately 1 g to approximately 3 g of the product. The remainder of the particles was collected at the bottom of the drying chamber, where they were disposed of as waste.

The encapsulated material was calcined in air at approximately 400° C. for approximately 3 hr to remove the CTAB. The surface area was approximately 275 m²/g, as measured by a BET $N_2$ adsorption analyzer, and the median diameter from sedigraph particle size analysis was 28 microns. SEM image (FIG. 1) shows that some of the particles comprise spherical shapes, while others comprise several dimples on their surfaces due to rupturing of the particles during the spray-drying process. A few of the particles are hollow and broken as seen in the SEM image. This is due to the formation of a rigid crust by premature solidification of silica. Furthermore, because the wall of the crust is thin, the particles break down easily due to particle-particle collision, particle-wall collision or handling of the dry powder. The majority of the particles are dense, as seen in the TEM images, discussed below.

Figure 2:
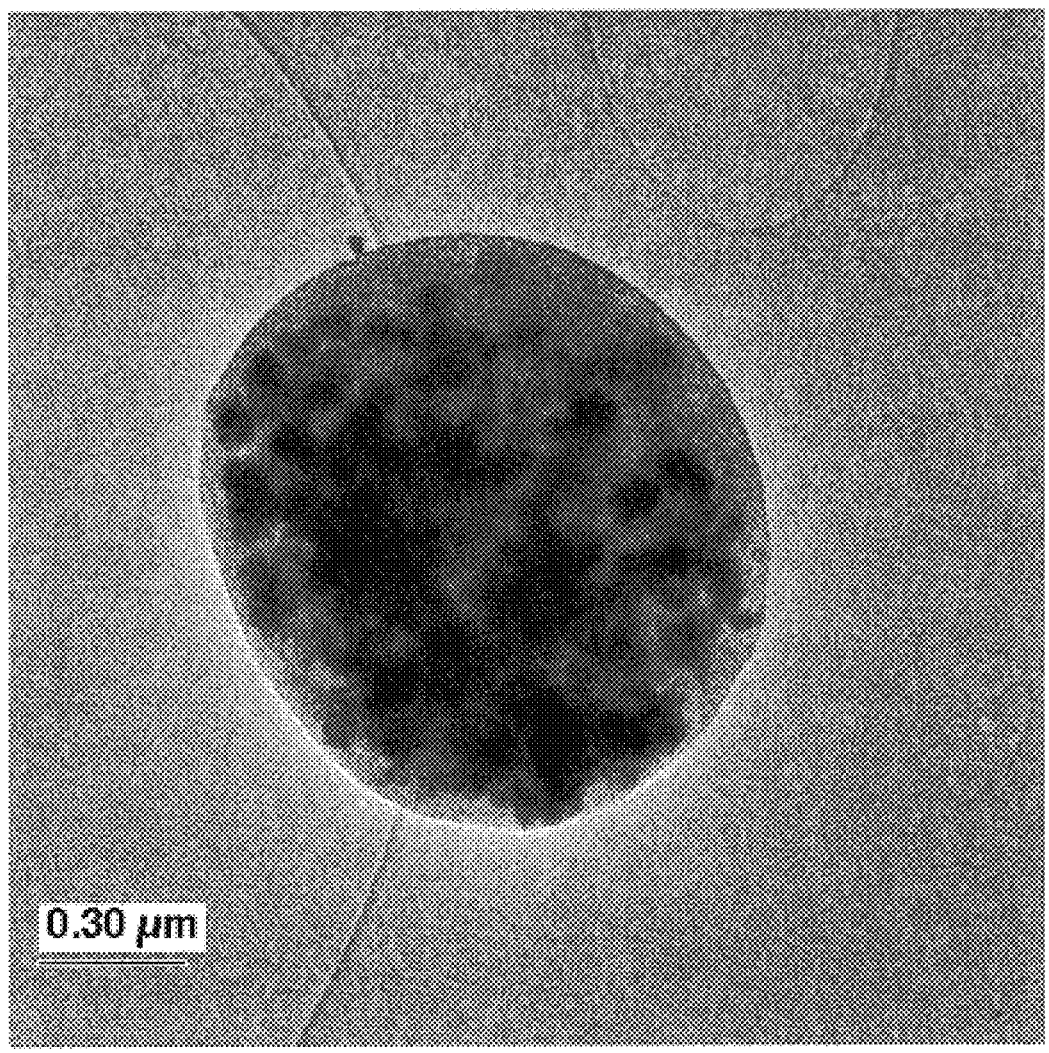
FIG. 2 shows a Transmission Electron Microscope ("TEM") image of Fe—Cu catalyst particles uniformly distributed within the silica shell.
Figure 3:
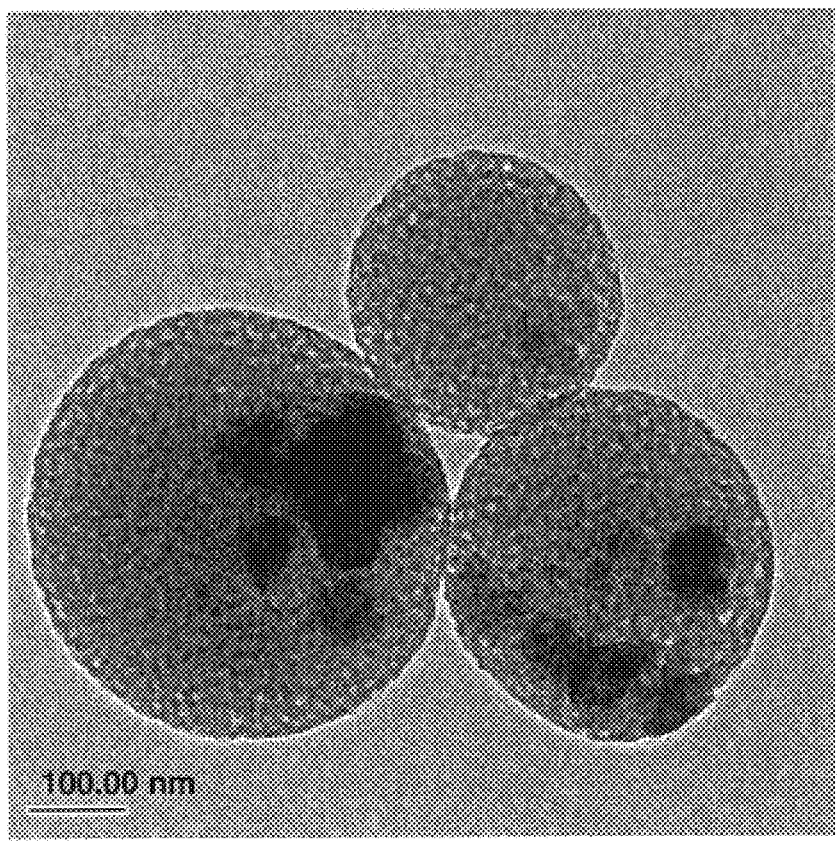
FIG. 3 shows (A) smaller size particles and (B) one of the particles at a higher magnification.
Figure 4:
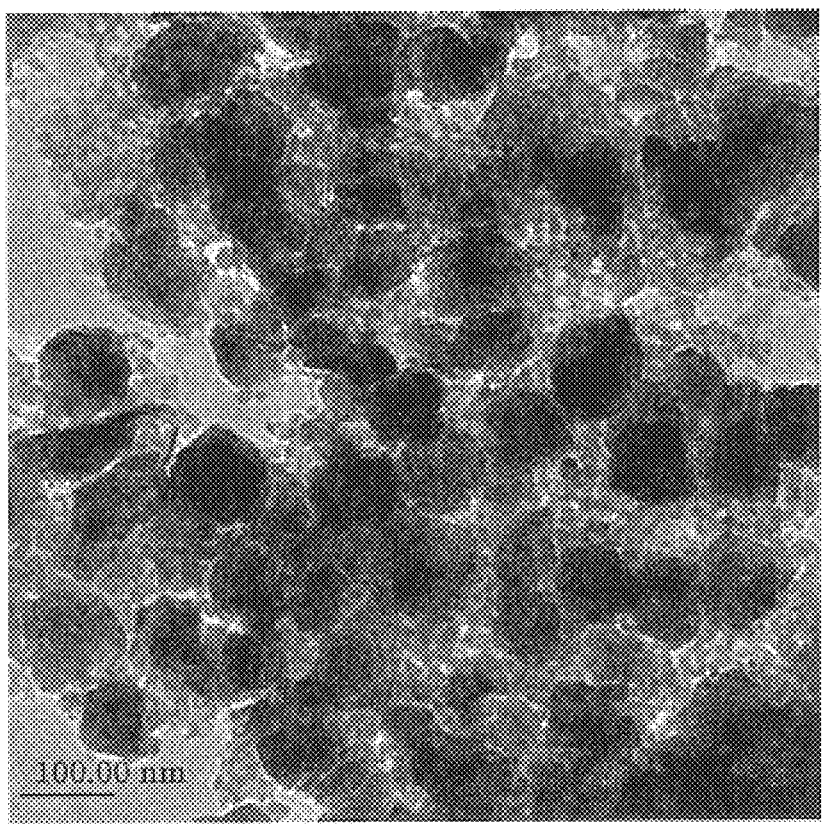
FIG. 4 shows a cross-sectioned TEM (XTEM) image of an encapsulated particle.
Figure 5:
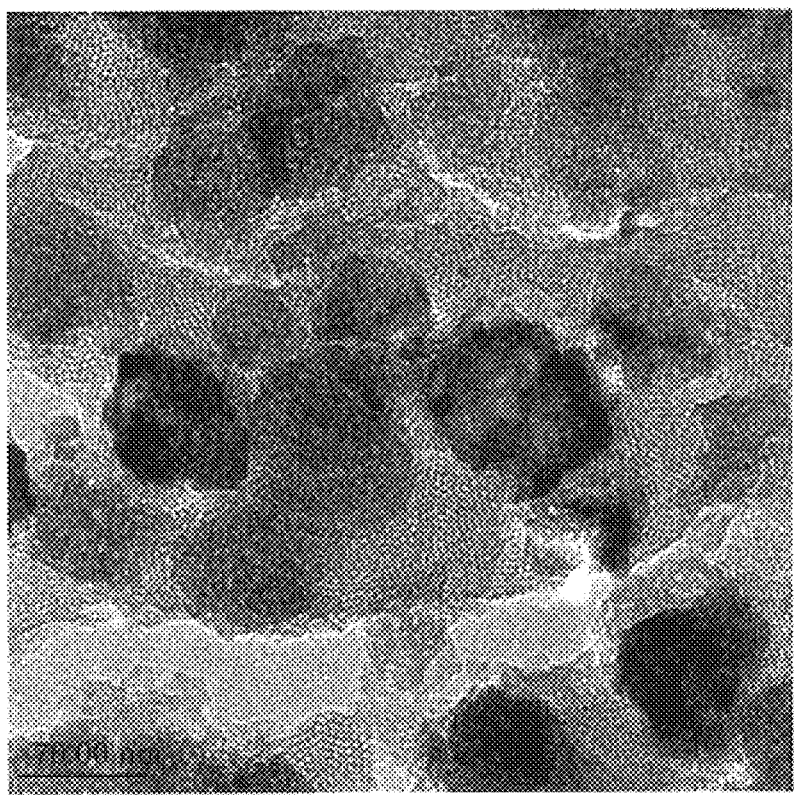
FIG. 5 shows a XTEM image of the internal microstructure of the particle.
Figure 6:
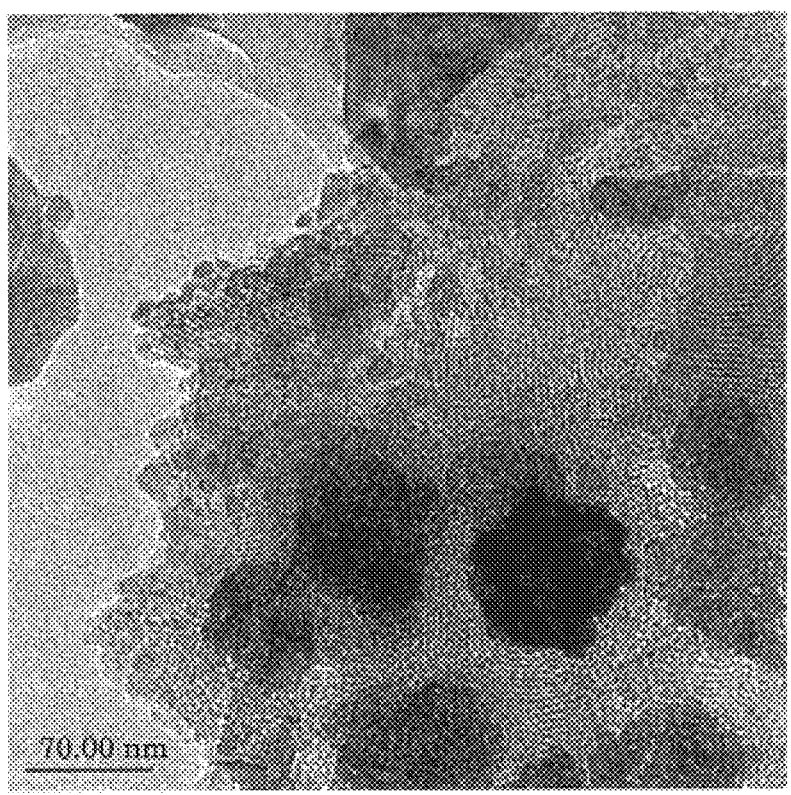
FIG. 6 shows a XTEM image of crystalline particles surrounded by the silica.

TEM image (FIG. 2) shows the precipitated Fe—Cu catalyst particles, with an average size of approximately 80 nanometers, are uniformly distributed within the silica. Furthermore, the nanoparticles appear to be almost completely encapsulated inside the spray-dried mesoporous silica. This is clarified by X-ray Photoelectron Spectroscopy, where the surface compositions of the Fe and Si elements are approximately 3.45% by weight and approximately 55.25% by weight, respectively. The surface composition is much less than the bulk composition, indicating that the Fe phase is distributed preferentially in the interior of the particles. FIG. 3 shows a higher magnification view. From this image, it is difficult to interpret the actual internal microstructure of the encapsulated material. Hence, microtoming or cross-sectioning was performed to investigate the internal microstructure. FIG. 4 shows a XTEM image of an encapsulated particle. The image shows that we can disperse a high loading of a catalytically active phase, in this case precipitated Fe—Cu catalyst, within the mesoporous silica. FIG. 5 shows a XTEM image of this particle at a higher magnification. In this image, the ordered pore structure in the silica phase can be clearly seen to be preserved all around the iron nanoparticles. FIG. 6 shows another XTEM image where the crystalline particles are surrounded by mesoporous silica. The internal microstructure does not involve a silica shell that encapsulates the catalyst particles. Rather, the iron particles seem to be uniformly distributed throughout the spray-dried particle.

Figure 7:
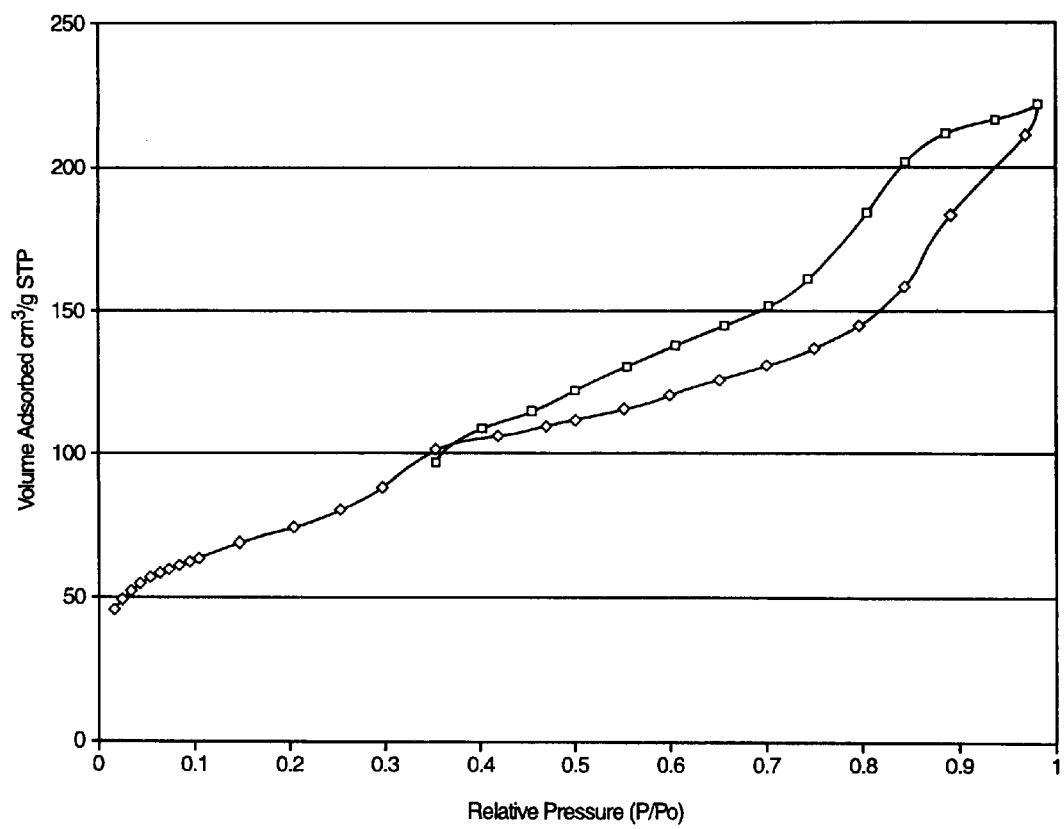
FIG. 7 show nitrogen adsorption/desorption curves for the encapsulated material.
Figure 8:
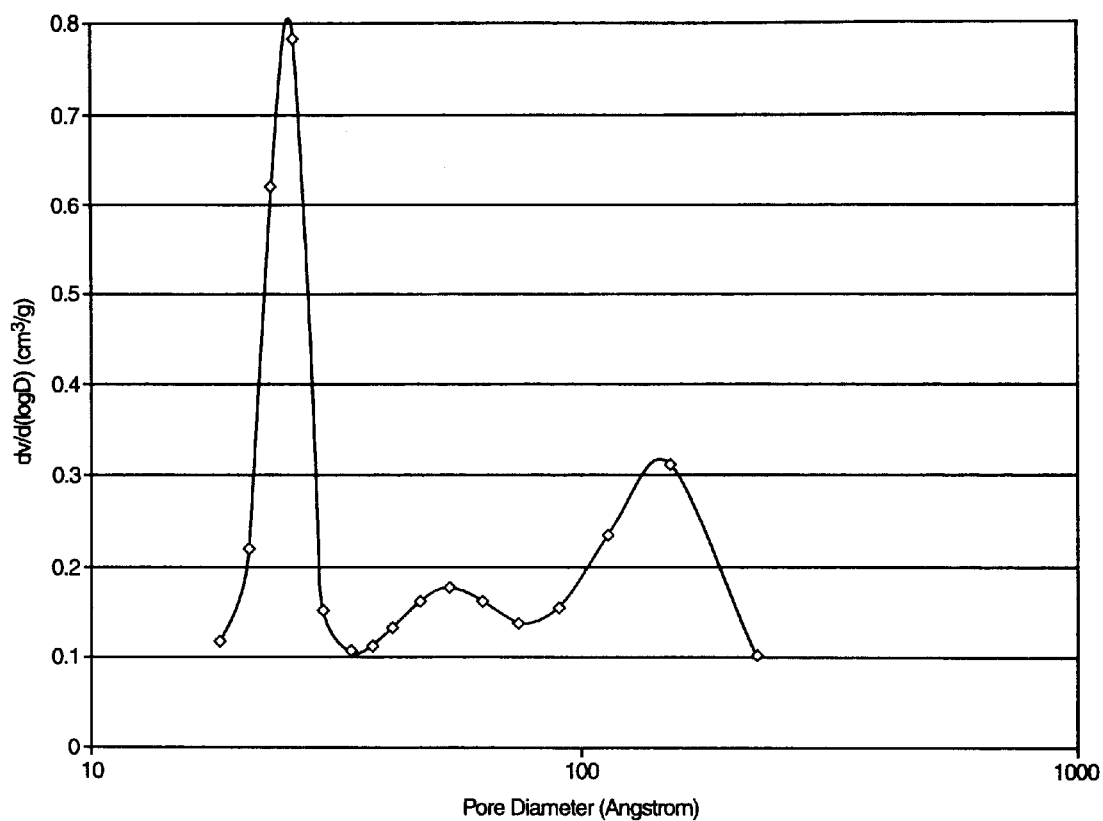
FIG. 8 shows pore size distribution of the encapsulated material.

FIG. 7 provides $N_2$ adsorption/desorption isotherm curves for the encapsulated material. The curves show hysteresis, indicating that a multi-dispersed phase is present. BJH pore size distribution plot (FIG. 8) shows three peaks. The peak at approximately 23 Å corresponds to the ordered mesoporous silica shell. The other two peaks at approximately 50 Å and approximately 150 Å correspond to the less ordered structures inside the silica shell.

EXAMPLE 2

The encapsulated material, prepared by EXAMPLE 1, was tested for its attrition using the ultrasonic fragmentation method. An approximately 0.05% by weight sodium hexametaphosphate (SHMP; Aldrich) solution was prepared by mixing approximately 0.5 g of sodium hexametaphosphate with approximately 1000 ml of deionized water. In a typical run, approximately 1.0 g of a catalyst sample was added to approximately 50 ml of the approximately 0.05% by weight SHMP solution which was used as a dispersing agent. A Micromeritics Sedigraph 5100 analyzer was used to initially measure the particle size distribution at approximately 0 min. Using a Tekmar 501 ultrasonic disrupter (20 kHz+50 Hz) equipped with a V1A horn and a ½ probe tip, the suspension was subjected to ultrasonic energy at an amplitude setting of 20 (100 W) at approximately 5-min intervals, up to approximately 25 min. After different extents of ultrasonic irradiation, the particle size distribution was analyzed to detect the mode of particle fragmentation.

Figure 9:
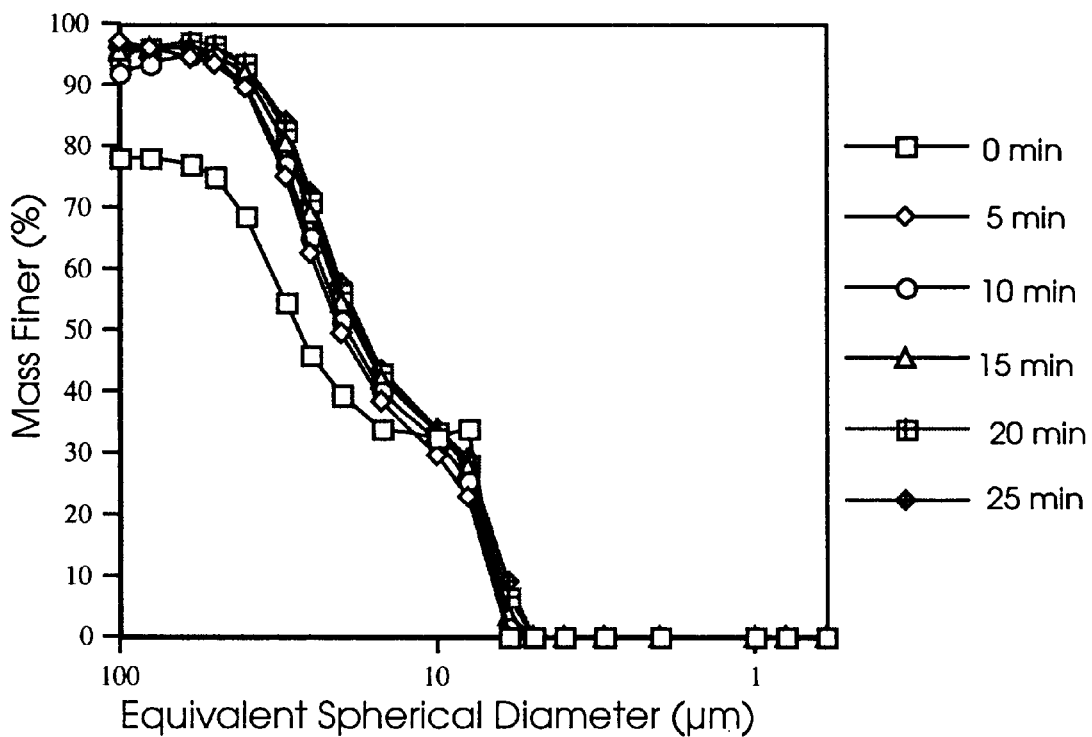
FIG. 9 shows cumulative particle size distribution for the encapsulated material undergoing ultrasonic fragmentation.

FIG. 9 is a cumulative particle size distribution plot for the encapsulated material. Two mechanisms exist during particle breakdown: fracture and erosion. Fracture is the division of an original agglomerate into several smaller agglomerates, and results from crack propagation through the agglomerate compact. Erosion is a process where primary particles are dislodged from the surface of the agglomerate when the cavitation pressure, created via ultrasonic fragmentation, exceeds the agglomerate strength.

There is attrition of particles after 5 min of ultrasonic irradiation due to fracture, as indicated by the shift in curves to the right, i.e., towards smaller size particles. However, little fracture occurs thereafter. Furthermore, very little generation of fine particles below approximately 6 microns occurs after approximately 25 min of ultrasonic irradiation due to erosion, as indicated by an increase in the percentage of fines for a particular particle size.

Adding silica to the precipitated Fe—Cu catalyst improves its attrition resistance. Previously, shown in Pham et al., Powder Technology, (in press, May 2000) that an unsupported precipitated Fe—Cu catalyst was weak. Spray-drying improved the aftrition resistance of the catalyst. Addition of precipitated silica to the catalyst coupled with spray-drying, further improved its aftrition resistance. A precipitated silica, however, does not allow control of the pore size to the same extent as with a templated silica precursor described in these images.

EXAMPLE 3

The encapsulated material, prepared by EXAMPLE 1, was tested to determine the extent of reducibility in $H_2$. In a typical run, approximately 25 mg of sample was added to a U-tube used for our reactor system. The sample was initially degassed in He at approximately 200° C. for approximately 1 hr to remove moisture or contaminants adsorbed on the surface of the sample, and then cooled back to room temperature. The catalyst was heated in $H_2$ from approximately 25° C. to approximately 300° C. at a rate of approximately 10° C./min, and was reduced at approximately 300° C. overnight.

In order to passivate the sample, it was initially purged in He at approximately 300° C. for approximately 30 min and cooled to room temperature. A very small amount of $O_2$ was introduced in the flowing He (<1% $O_2$ in He). The oxygen was then gradually increased to a final concentration of approximately 20% $O_2$ in He in order to simulate atmospheric conditions. Passivation was achieved when there was no further rise in temperature with an increase in $O_2$ intake.

Figure 10A:
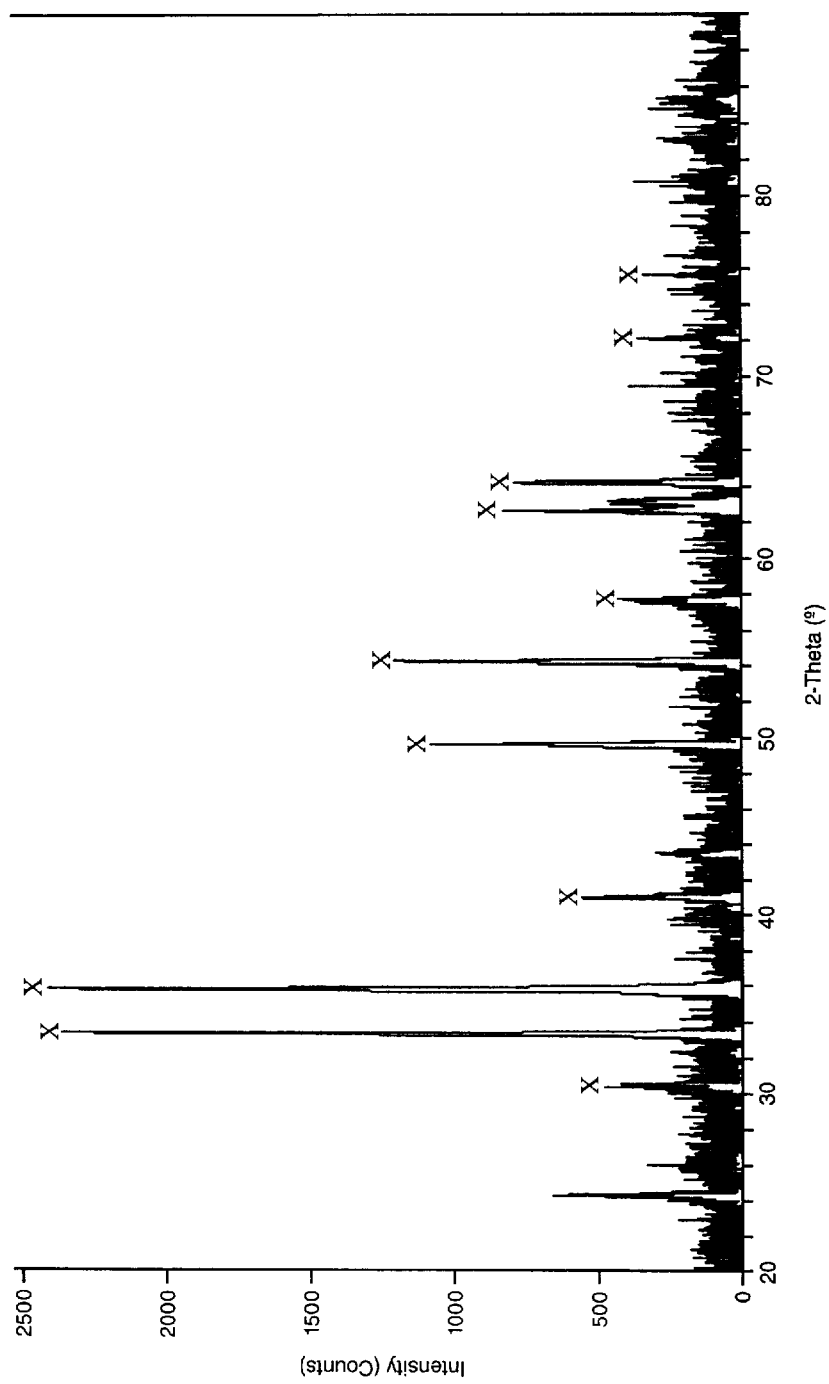
FIG. 10 shows X-Ray Diffraction ("XRD") patterns for the encapsulated material before (A) and after (B) reduction in hydrogen.
Figure 10B:
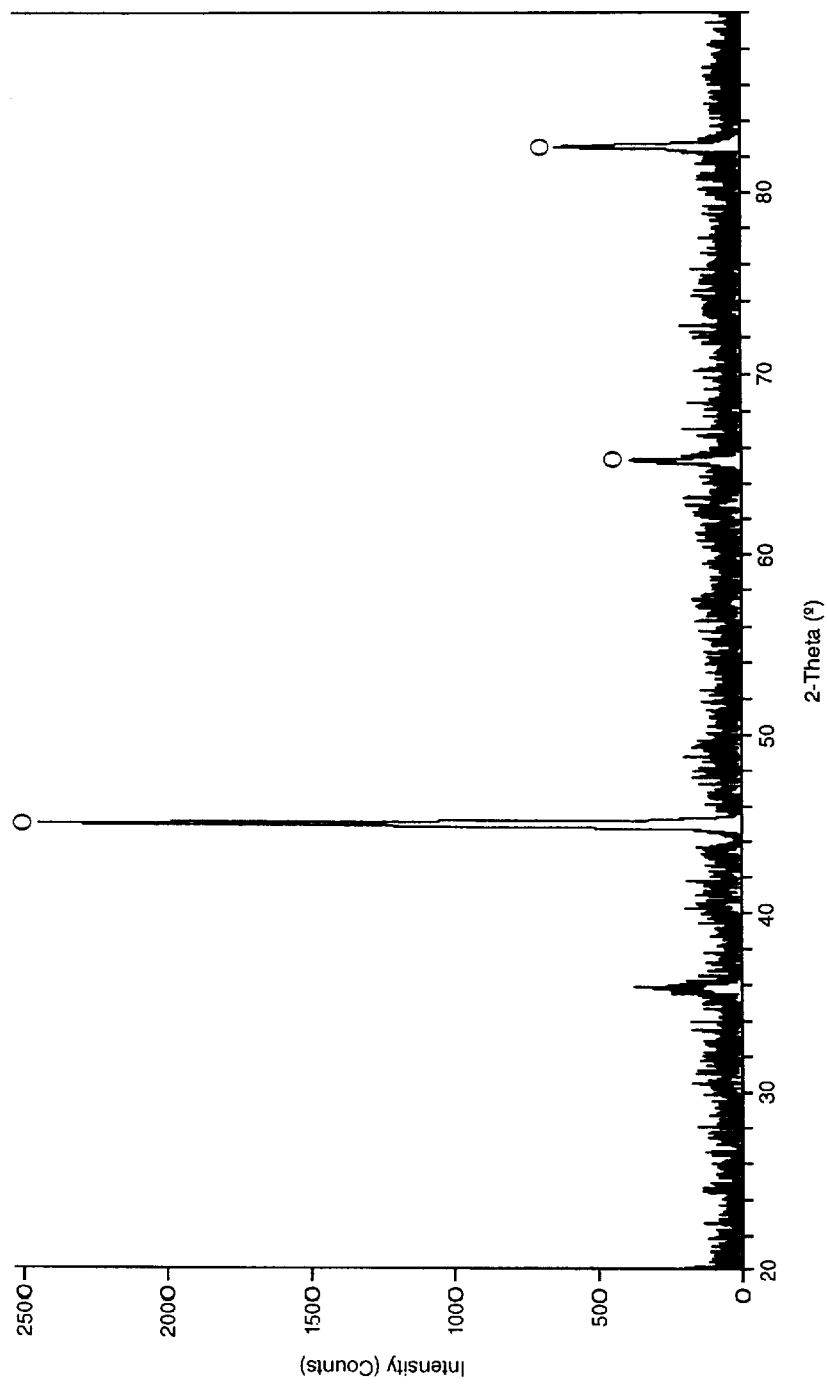

FIG. 10 shows XRD plots for the encapsulated material, before and after reduction. Before reduction (FIG. 10A), the precipitated Fe—Cu catalyst is determined to be hematite ($\alpha$-$Fe_2O_3$; indicated by x) with copper as a promoter. After reduction (FIG. 10B), there are no peaks corresponding to hematite. Instead, hematite has been reduced to $\alpha$-Fe (indicated by o). Silica does not appear to affect the reducibility of the catalyst. The pores of the silica are large enough to allow catalyst accessibility to the gas phase, while the nanoparticles are maintained inside the silica structure. This experiment shows that the iron phase is completely reducible in $H_2$, as determined by X-ray diffraction. Reduction of the iron oxide is a necessary step in making it active as a Fischer-Tropsch catalyst.

EXAMPLE 4

The following example describes the phase transformations that an iron oxide particle undergoes as it is activated for a Fischer-Tropsch synthesis process. Approximately 1 g of a pure iron oxide (promoted with Cu and K) catalyst was loaded into a U-tube reactor. The catalyst was treated in approximately 20 sccm of $H_2$ at approximately 270° C. for approximately 2 hours. Fischer-Tropsch synthesis was carried out at a $H_2$/CO ratio of approximately 0.7 at approximately 250° C. The CO contained approximately 3% Argon as an internal standard to allow quantitation of the reaction products using a gas chromatograph equipped with a thermal conductivity detector. After reaction, the catalysts were removed from the reactor after careful and highly controlled passivation. This involved purging with Helium at the reaction temperature, cooling the sample to room temperature, and exposing it to small amounts of $O_2$ in a stream of flowing Helium till a final $O_2$ content of approximately 20% was reached.

Figure 11:
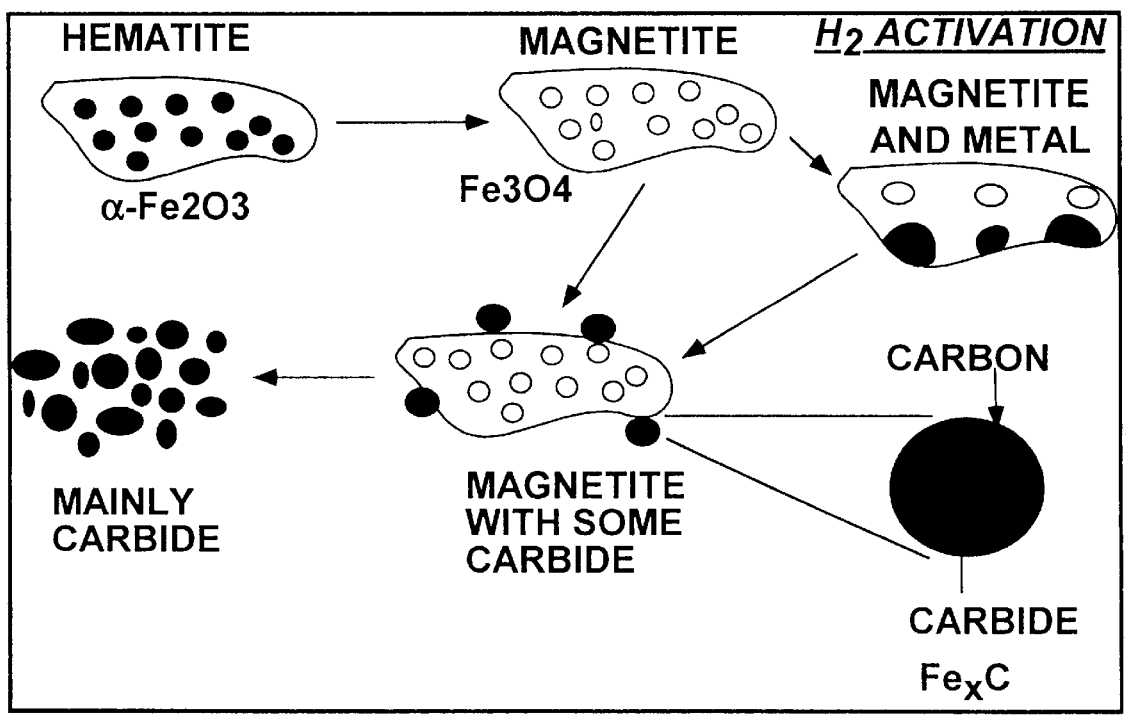
FIG. 11 shows a schematic diagram of the phase transformation occurring in iron oxide Fischer-Tropsch catalysts as they are activated and used in the synthesis reaction.
Figure 12:
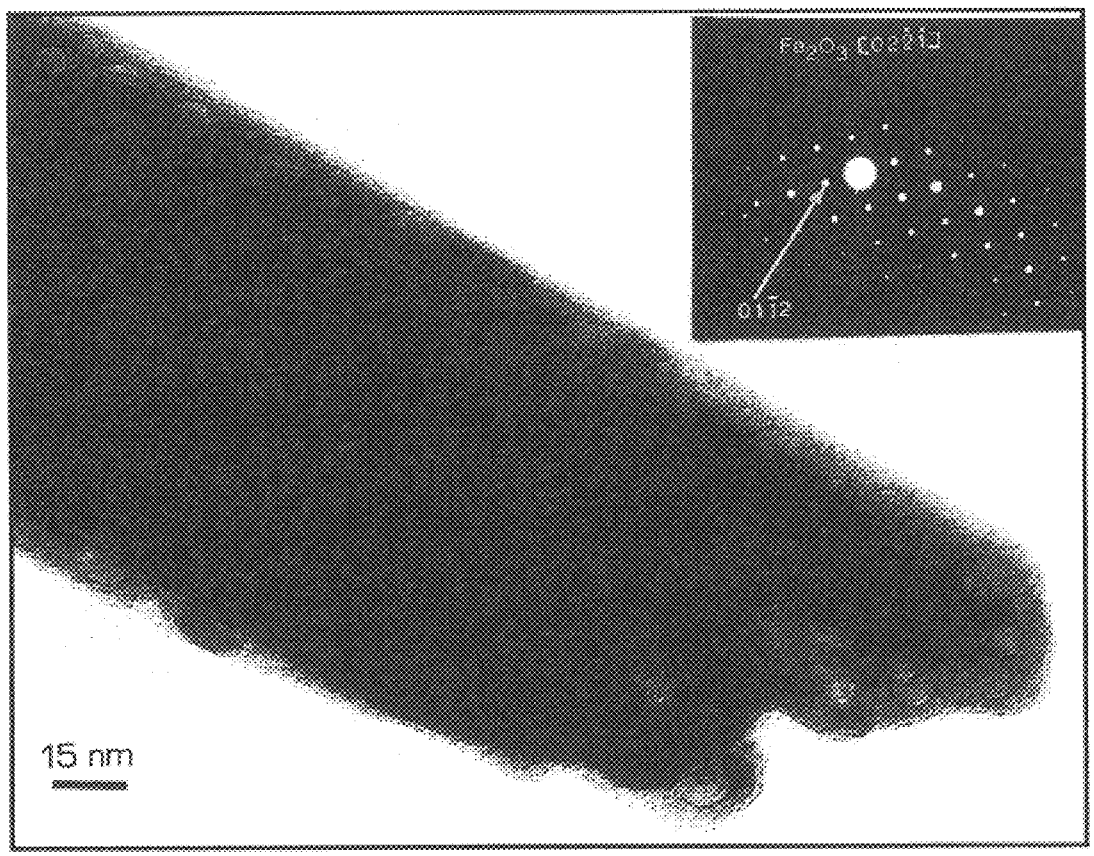
FIG. 12 shows a high-resolution transmission electron microscope ("HRTEM") image showing single crystals of $\alpha$-$Fe_2O_3$ (hematite) which is the starting material for this catalyst.
Figure 13:
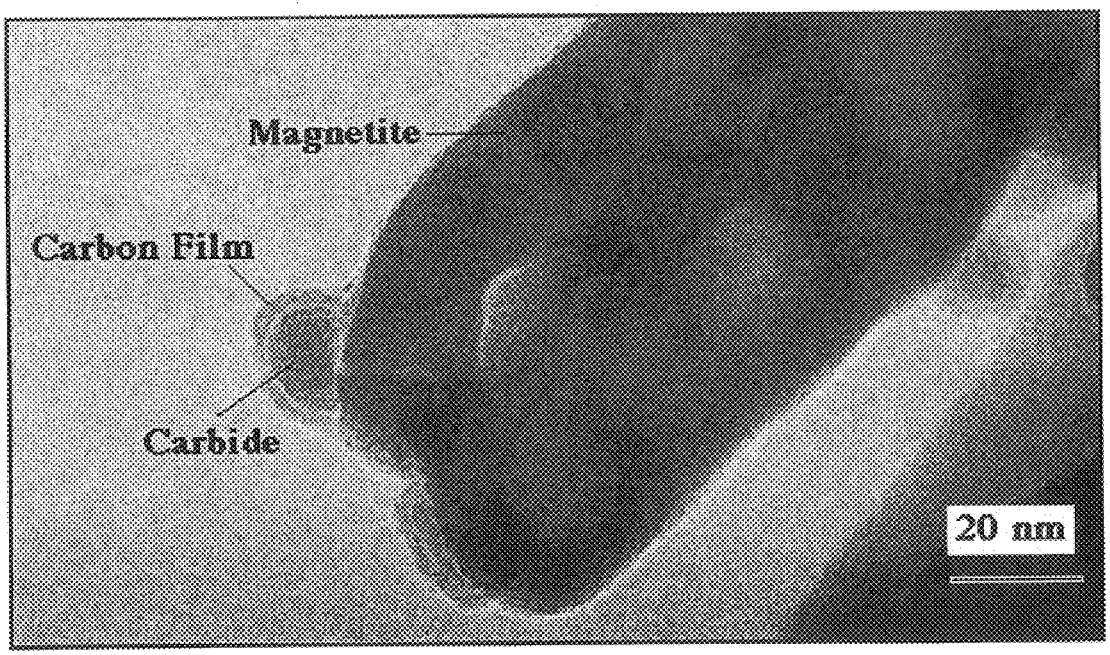
FIG. 13 shows an HRTEM image of the iron oxide crystals after being reduced in $H_2$ and used in the Fischer-Tropsch synthesis for a short time (10 hours). The hematite has transformed into magnetite and has started to partially transform into small nanometer sized particles of iron carbide.
Figure 14:
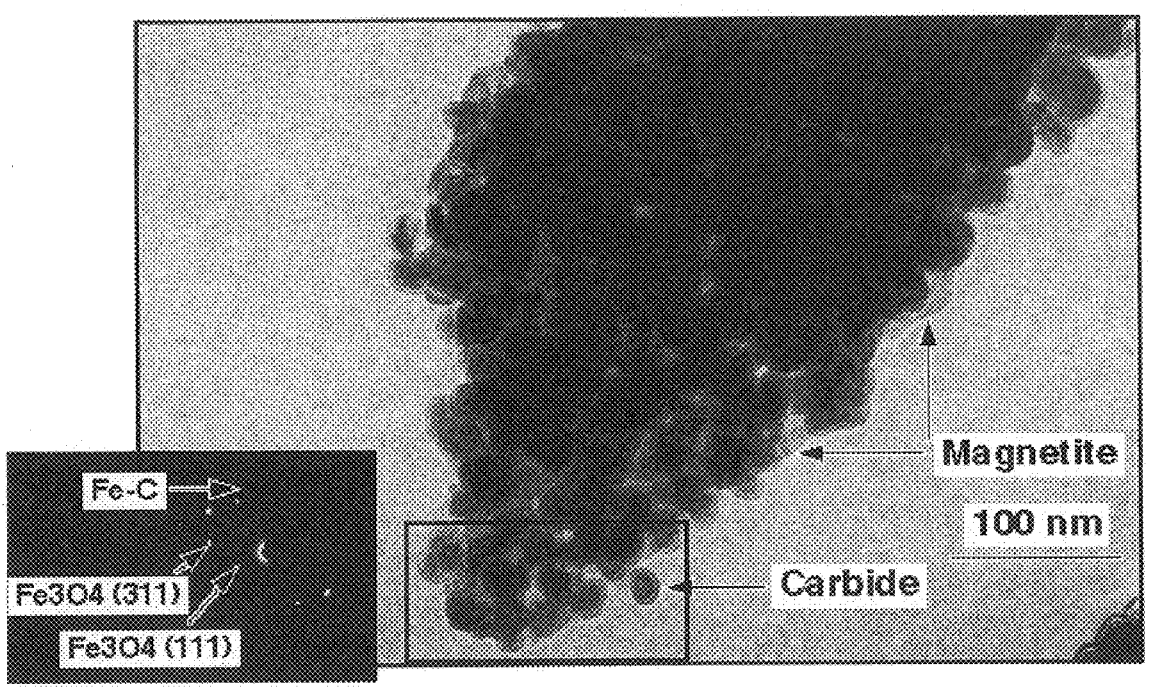
FIG. 14 shows an HRTEM image after the phase transformation into iron carbide has proceeded to a significant extent. The hematite crystal is now broken up into smaller nano-scale particles of carbide, which are only loosely held together.

FIG. 11 shows a schematic diagram of the phase transformations in this catalyst system as reported previously (See Shroff et al., *J. Catal.*, 156, 185 (1995)). Single crystals of $\alpha$-$Fe_2O_3$ first transform into $Fe_3O_4$, a process that does not lead to any break-up of the particles. The next step involves a transformation into $\alpha$-Fe or into iron carbide depending on the reducing gas ($H_2$, or CO respectively). The higher density of the reduced Fe phases causes a break-up of the primary hematite crystals. This process is shown in FIGS. 12–14. FIG. 12 shows the single crystals of hematite. FIG. 13 shows a partial transformation of the magnetite into iron carbide. FIG. 14 shows how the catalyst looks after nearly complete phase transformation into iron carbide. The nano-scale carbide particles are now loosely held together and could easily separate during the reaction and disperse into the liquid Fischer-Tropsch reaction products. To hold them together, a support structure is necessary. The mesoporous supports described in this invention provide a means to retain nano-scale particles derived from this phase transformation within the silica support structure.

EXAMPLE 5

This example illustrates a typical application of the catalysts according to the present invention for Fischer-Tropsch synthesis. The spray-dried, calcined, encapsulated calcined material is used in a F-T synthesis process performed in a approximately 1 $dm^3$ stirred tank slurry reactor (STSR). A standard six-blade turbine impeller, 3.2 cm in diameter and with a stirrer speed of approximately 1200 rpm is used for the reaction. A hydrogenated 1-decene homopolymer is used as the initial slurry liquid medium, and the catalyst material is added to give the desired weight percent of slurry (e.g., approximately 5% by weight). The feed gases ($H_2$ preferably greater than approximately 99.5% purity, and CO preferably greater than approximately 99.3% purity) or a premixed gas pass through a series of oxygen removal, alumina and activated charcoal traps to remove $O_2$, iron carbonyls, water, and hydrocarbon impurities.

For pretreating, the slurry at atmospheric pressure is heated from room temperature to approximately 150° C. at a heating rate of approximately 2 to approximately 4° C./min in He, and then held at approximately 150° C. for approximately 2 hr. The STSR is pressurized to a desired pressure (e.g., approximately 0.78 MPa), and is heated to a desired reduction temperature (e.g., approximately 250° C.) at approximately 2° C./min in He at approximately 3 normal liters/g-cat.h. Helium is then replaced with hydrogen. The hydrogen reduces the hematite phase into magnetite. At the end of the pretreatment, $H_2$ is replaced with He, the STSR is pressurized to a desired pressure (e.g., approximately 1.48 MPa), and the slurry is cooled down or heated to a desired reaction temperature (e.g., approximately 260° C.). At the reaction temperature, He is replaced with syngas (molar feed ratio $H_2$/CO=0.67) at a gas space velocity of approximately 1.4 normal liters/g-cat.h. Test duration can be several hundred hours on stream.

As the F-T reaction proceeds, the exit gas passes through a series of high and low (ambient) pressure traps to condense liquid products. During mass balance periods, liquid products are allowed to accumulate in high and low pressure mass balance (steady state) traps. Afterwards, flow is directed to waste traps placed in parallel with the mass balance traps, and liquid products from the mass balance traps are collected and weighed. All products collected in the steady state traps are analyzed by gas chromatography after physical separation into an aqueous and organic phase. Oxygenates in the aqueous phase are analyzed using a 1.8 m Porapak Q column and a flame ionization detector (FID). The amount of water present in the aqueous phase is determined by a Karl-Fischer titration method. Hydrocarbons and oxygenated compounds in the organic phase are quantified using an approximately 30 meter fused silica capillary column and an FID.

The high molecular weight hydrocarbons (wax) accumulate in the reactor and have to be removed periodically from the reactor to prevent the reactor from filling with wax. Periodically, a sample of the liquid products including the catalyst can also be obtained to monitor the changes in catalyst phase and composition. The wax is removed from the reactor through a porous cylindrical sintered metal filter with a nominal pore size of 0.5 microns and is analyzed using a wide bore fused silica capillary column (10 m×0.53 mm) and a FID. The reactants and non-condensable products are analyzed on a gas chromatograph (Carle AGC 400) equipped with multiple columns and both flame ionization and thermal conductivity detectors.

The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method for encapsulating a dispersed insoluble compound in a mesoporous structure comprising the steps of:
   a) combining a soluble oxide precursor, a solvent and a surfactant to form a mixture;
   b) dispersing an insoluble compound in the mixture;
   c) spray-drying the mixture to produce dry powder; and
   d) calcining the powder to yield a porous structure comprising the dispersed insoluble compound.

2. The method of claim 1 further comprising the step of introducing a precipitation control agent to the mixture to control precipitation of the oxide precursor.

3. The method of claim 2 wherein the agent comprises at least one agent selected from the group consisting of HCl and $HNO_3$.

4. The method of claim 1 further comprising the step of cooling the mixture to control precipitation of the oxide precursor.

5. The method of claim 1 wherein the oxide precursor comprises an alkoxide of silicon.

6. The method of claim 5 wherein the alkoxide of silicon comprises tetraethyl orthosilicate.

7. The method of claim 1 wherein the oxide precursor comprises at least one precursor selected from the group consisting of silicic acid, zirconium alkoxide, titanium alkoxide, aluminum alkoxide.

8. The method of claim 1 wherein the surfactant comprises at least one ammonium ion.

9. The method of claim 1 wherein the surfactant comprises at least one surfactant selected from the group consisting of cetyltrimethylammonium bromide and cetyltrimethylammonium chloride.

10. The method of claim 1 further comprising at least one step of adjusting pH of the mixture.

11. The method of claim 10 wherein the at least one adjusting step adjusts the pH of the mixture to a pH less than approximately pH 5.

12. The method of claim 1 wherein the insoluble compound comprises at least one oxide.

13. The method of claim 12 wherein the at least one oxide comprises at least one oxide selected from the group consisting of iron oxide, titanium oxide, cobalt oxide and vanadium oxide.

14. The method of claim 1 wherein the insoluble compound comprises at least one zeolite.

15. The method of claim 14 wherein the at least one zeolite comprises ZSM-5 zeolite.

16. The method of claim 1 wherein the insoluble compound comprises at least one non-oxide phase.

17. The method of claim 16 wherein the at least one non-oxide phase comprises at least one non-oxide phase selected from the group consisting of nitride and carbide.

18. The method of claim 17 wherein the at least one non-oxide phase comprises molybdenum nitride.

19. The method of claim 16 wherein the at least one non-oxide phase comprises at least one carbide selected from the group consisting of iron carbide and molybdenum carbide.

20. The method of claim 1 wherein the dispersing step comprises sonication.

21. The method of claim 1 wherein the mixture of the combining step forms a template for templating a mesoporous structure.

22. The method of claim 1 wherein the precipitation control agent of the introducing step allows for formation of a template for templating a mesoporous structure by delaying precipitation of the oxide precursor.

23. The method of claim 1 wherein the insoluble compound of the dispersing step comprises colloidal dimensions.

24. The method of claim 1 wherein the calcining step substantially removes the surfactant.

25. The method of claim 1 wherein the resulting porous structure comprises greater than approximately 30% by weight of the insoluble compound.

26. The method of claim 25 wherein the resulting porous structure comprises greater than approximately 50% by weight of the insoluble compound.

* * * * *